United States Patent
Sugiura

(10) Patent No.: US 9,637,009 B2
(45) Date of Patent: May 2, 2017

(54) ELECTRIC VEHICLE

(71) Applicant: Masanori Sugiura, Toyota (JP)

(72) Inventor: Masanori Sugiura, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 511 days.

(21) Appl. No.: 14/218,086

(22) Filed: Mar. 18, 2014

(65) Prior Publication Data

US 2014/0286060 A1 Sep. 25, 2014

(30) Foreign Application Priority Data

Mar. 21, 2013 (JP) ................. 2013-058265

(51) Int. Cl.
  *H02H 7/122* (2006.01)
  *B60L 11/18* (2006.01)
  *B60L 1/00* (2006.01)
  *H02H 3/087* (2006.01)
  *H02H 7/12* (2006.01)
  *H02M 1/32* (2007.01)

(52) U.S. Cl.
  CPC ............ *B60L 11/1803* (2013.01); *B60L 1/00* (2013.01); *B60L 11/1853* (2013.01); *H02H 3/087* (2013.01); *H02H 7/1213* (2013.01); *H02M 2001/322* (2013.01); *Y02T 10/7005* (2013.01); *Y02T 10/705* (2013.01)

(58) Field of Classification Search
  CPC .... H02H 7/1222; B60L 11/1803; H02J 9/061; H02M 3/156; H02M 3/07
  See application file for complete search history.

(56) References Cited

U.S. PATENT DOCUMENTS

| 2010/0214055 A1 | 8/2010 | Fuji et al. |
| 2012/0055727 A1* | 3/2012 | Omiya ............... B60K 6/445 180/279 |

FOREIGN PATENT DOCUMENTS

| CN | 101814720 A | 8/2010 |
| EP | 2431211 A1 | 3/2012 |
| JP | 2002-010627 A | 1/2002 |
| JP | 2008-072880 A | 3/2008 |
| JP | 2011-217544 A | 10/2011 |

(Continued)

*Primary Examiner* — Jared Fureman
*Assistant Examiner* — Rafael Pacheco
(74) *Attorney, Agent, or Firm* — Andrews Kurth Kenyon LLP

(57) ABSTRACT

An electric vehicle includes: a main battery; an electric power converter configured to convert power to driving power of a drive motor; an auxiliary battery configured to supply power to auxiliaries; a power supply harness connecting the auxiliary battery to the auxiliaries; a step-down converter having an output end connected to the power supply harness, the step-down converter being configured to step down an output voltage of the main battery to the driving voltage of the auxiliaries; an interrupter configured to isolate the step-down converter from the power supply harness at the time when a predetermined specific abnormality has been detected; and a discharger configured to discharge a capacitor incorporated in the electric power converter, the discharger being configured to operate by receiving electric power supplied from a first power supply path which connects the output end of the step-down converter to the interrupter.

6 Claims, 4 Drawing Sheets

(56) References Cited

FOREIGN PATENT DOCUMENTS

JP        2013-236442 A    11/2013
WO     2010/131340 A1   11/2010

\* cited by examiner

ELECTRIC VEHICLE

INCORPORATION BY REFERENCE

The disclosure of Japanese Patent Application No. 2013-058265 filed on Mar. 21, 2013 including the specification, drawings and abstract is incorporated herein by reference in its entirety.

BACKGROUND OF THE INVENTION

1. Field of the Invention

The invention relates to an electric vehicle. Specifically, the invention relates to an electric vehicle that includes a discharger for discharging a capacitor installed in an electric power converter. The "electric vehicle" according to the invention also includes a fuel-cell vehicle and a hybrid vehicle that includes both a drive motor and an engine.

2. Description of Related Art

A drive motor of an electric vehicle generally has a rated output that reaches several tens of kilowatts. Therefore, large current flows through an electric power converter that supplies driving power to the motor. The electric power converter is typically an inverter that converts direct-current power to alternating-current power, and includes a capacitor that smooths current. The capacitor is to suppress pulsation of current supplied, and a large-capacitance capacitor is employed as the capacitor because current flowing through the electric power converter is large in the electric vehicle. Such an electric vehicle desirably includes a device (discharger) that quickly discharges the capacitor in the case where electric power stored in the capacitor is not required. The case where electric power stored in the capacitor is not required is typically the case where the vehicle has had an accident (trouble, collision, or the like). There is an example of the discharger, which converts electric power stored in the capacitor to thermal energy to consume the electric power by, for example, connecting the capacitor to a discharge resistor having a large heat generation amount through energization and having a high thermal resistance in the event of a collision. There is another example of the discharger, which is described in Domestic Re-publication of PCT International Application No. WO2010/131340.

SUMMARY OF THE INVENTION

In the electric vehicle, the voltage of direct-current power that is supplied from a main battery is stepped down by a step-down converter, and an auxiliary battery is charged with the direct-current power. Control operation for discharging the capacitor with the use of the discharger as needed is also executed by utilizing the stepped-down electric power. Electric power is supplied to the discharger via a power supply harness running in the vehicle. Therefore, when there occurs a collision of the electric vehicle, part of the power supply harness may contact a metal portion, such as the body of the vehicle, to cause a ground fault. When there occurs a ground fault, overcurrent flows through the auxiliary battery and the step-down converter, and an overcurrent protection circuit provided in the auxiliary battery or the step-down converter is activated. The overcurrent protection circuit typically interrupts the power supply harness from a power system. In order to ensure further reliable safety, it is conceivable to isolate the power supply harness from the power system although no overcurrent has been detected at the time when a collision has been detected. Generally speaking, the electric vehicle may be configured to isolate the power supply harness from the power system when a predetermined specific abnormality (the above-described overcurrent, collision, or the like) has been detected. When the specific abnormality has been detected, the power supply harness is isolated from the power system, with the result that electric power is not supplied to the discharger through the power supply harness. The invention provides an electric vehicle that supplies electric power to the discharger even when electric power is not supplied through the power supply harness.

An aspect of the invention provides an electric vehicle. The electric vehicle includes: a main battery configured to store electric power that is supplied to a drive motor; an electric power converter configured to convert direct-current power, which is supplied from the main battery, to driving power of the drive motor; an auxiliary battery configured to supply direct-current power to auxiliaries having a lower driving voltage than a driving voltage of the drive motor; a power supply harness connecting the auxiliary battery to the auxiliaries; a step-down converter having an input end connected to the main battery and an output end connected to the power supply harness, the step-down converter being configured to step down an output voltage of the main battery to the driving voltage of the auxiliaries; an interrupter configured to isolate the step-down converter from the power supply harness at the time when a predetermined specific abnormality has been detected; and a discharger configured to discharge a capacitor incorporated in the electric power converter, the discharger being configured to operate by receiving electric power supplied from a first power supply path which connects the output end of the step-down converter to the interrupter. Here, the "predetermined specific abnormality" includes the case where a collision has been detected, the case where overcurrent has flowed through the power supply harness, the case where the power supply harness has a ground fault, and the like. The interrupter may be a semiconductor switch, such as an IGBT, or a mechanical switch, such as an electromagnetic relay. With the above configuration, for example, when the power supply harness contacts a metal portion, such as the body of the vehicle, and overcurrent has flowed through the step-down converter, the interrupter electrically isolates the step-down converter from the power supply harness. Therefore, the step-down converter is isolated from the ground-fault circuit, and is allowed to continue operating. The discharger is allowed to continuously receive electric power supplied from a first power supply path which connects the output end of the step-down converter to the interrupter (current upstream side with respect to the interrupter).

In the electric vehicle according to the aspect of the invention, the interrupter may be configured to isolate the step-down converter from the power supply harness at the time when overcurrent has flowed through the power supply harness. At the time when overcurrent has flowed, the interrupter electrically isolates the step-down converter from the power supply harness. Thus, the discharger is allowed to receive electric power supplied from the step-down converter thereafter.

In the electric vehicle according to the aspect of the invention, the discharger may include a second power supply path through which electric power is supplied to a power receiving end of the discharger via the power supply harness and a third power supply path through which electric power is supplied to the power receiving end of the discharger from the first power supply path. In addition, the electric vehicle may further include a power feeding path switch configured to switch the second and the third power supply path, through which electric power is supplied to the power receiving end of the discharger, from the second power supply path to the third power supply path when the interrupter operates. The "power receiving end of the discharger" means a terminal that receives electric power for driving the discharger. When the power supply harness is normally functioning, the discharger should also receive electric power supplied through the power supply harness. Many auxiliaries are connected to the power supply harness, and a voltage is stable. On the other hand, at the first power supply path which is closer to the step-down converter than the interrupter, a voltage higher than the output voltage of the auxiliary battery is supplied when the step-down converter is operating; whereas a voltage lower than the output voltage of the auxiliary battery is supplied via the auxiliary battery and the interrupter when the step-down converter is not operating, so a voltage is instable. Therefore, electric power supplied to the power receiving end of the discharger should be received through the second power supply path including the power supply harness with the use of the power feeding path switch when the power supply harness is functioning (when the interrupter is not operating), and should be received through the third power supply path from the first power supply path when the power supply harness is not functioning (when the interrupter is operating).

The power feeding path switch may include: a first diode inserted in the second power supply path; a second diode inserted in the third power supply path; and a voltage step-down transformer configured to step down a voltage, which is supplied to the power receiving end of the discharger via the second diode, to a voltage lower than a voltage that is supplied to the power receiving end of the discharger via the first diode. With this configuration, because of interposition of the voltage step-down transformer, the potential of the power receiving end through the third power supply path in which the second diode is inserted is lower than the potential of the power receiving end through the second power supply path in which the first diode is inserted. Therefore, both the first and second power supply paths are electrically connected to the power receiving end in a conductive state where the interrupter is not operating; however, the discharger receives electric power through the second power supply path in which the first diode is inserted due to the potential difference. That is, the discharger receives electric power supplied through the second power supply path including the power supply harness. In contrast to this, in an interrupted state where the interrupter is operating, the discharger receives electric power through the third power supply path in which the second diode is inserted. The power feeding path switch does not need to use a mechanical switch or relay and does not need switching control. Therefore, a circuit configuration and a control program become simple.

The power feeding path switch may have a relay configured to switch a connection destination on the basis of whether electric power is supplied to the relay, the relay being configured to connect the power receiving end of the discharger to the second power supply path while electric power is being supplied to the relay and connect the power receiving end of the discharger to the third power supply path when supply of electric power to the relay is stopped. The thus-configured relay connects the power receiving end of the discharger to the power supply harness while electric power is being supplied to the relay. The relay connects the power receiving end of the discharger to the first power supply path by the third power supply path when supply of electric power to the relay is stopped. The relay may be a static relay (semiconductor relay) that is formed of a semiconductor switch, such as a solid state relay (SSR), or a mechanical relay, such as an electromagnetic relay. Thus, switching is exclusively and logically performed, so switching of the power supply path becomes reliable, and the number of components may reduce in comparison with the case where the diodes are used.

The electric vehicle according to the aspect of the invention may further include a casing configured to accommodate the electric power converter, the discharger, the step-down converter, the interrupter and the power feeding path switch in the same accommodating space. With the thus-configured casing, it is possible to further reliably activate the discharger after a collision.

The details of the technique described in the specification and further improvement will be described in an embodiment of the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
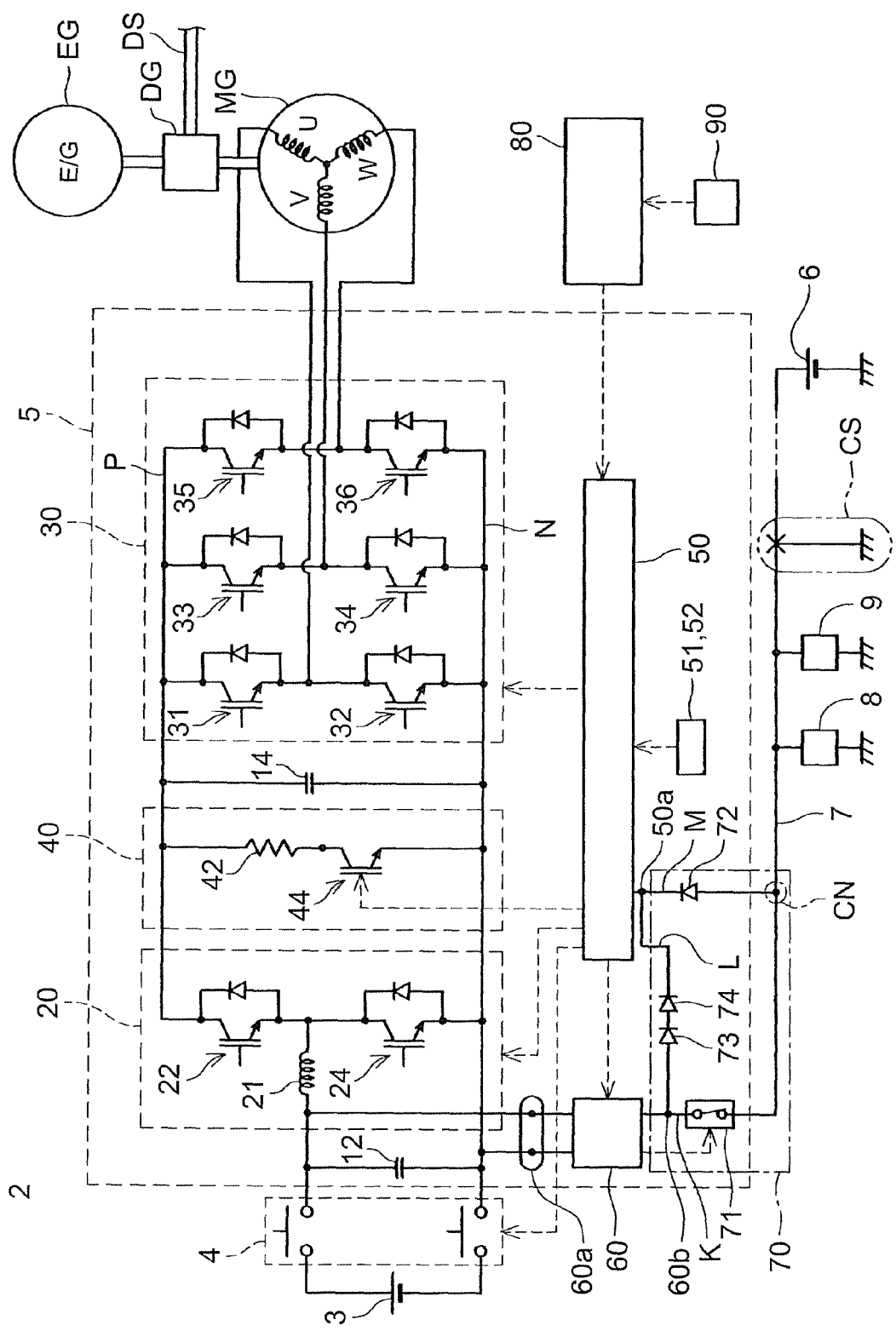
FIG. 1 is a block diagram that shows the configuration of a hybrid vehicle according to an embodiment.

An electric vehicle according to an embodiment will be described with reference to the accompanying drawings. The electric vehicle according to the embodiment is a hybrid vehicle 2 that includes both a motor and an engine as driving sources. FIG. 1 shows a block diagram of the hybrid vehicle 2. The hybrid vehicle 2 includes the motor MG and the engine EG as the driving sources. The output torque of the motor MG and the output torque of the engine EG are distributed or combined by a power distribution mechanism DG as needed, and are transmitted to an a drive shaft DS (that is, wheels). It should be noted that FIG. 1 only shows components that are required to describe the technique on which the present specification focuses and part of components not regarding the description are not shown in the drawing.

Electric power for driving the motor MG is supplied from a main battery 3. The output voltage of the main battery 3 is, for example, 300 volts. The hybrid vehicle 2 includes not only the main battery 3 but also an auxiliary battery 6 for supplying electric power to devices that are driven at a voltage lower than the output voltage of the main battery 3. The devices include a car navigation system 8, a room lamp 9, and the like. A signal processing circuit (such as a PWM generating circuit) of a power control unit 5 (hereinafter referred to as "PCU 5") (described later), other than a large-current-system circuit, is also one of auxiliaries. The term "main battery" and the term "auxiliary battery" are used to distinguish the two batteries from each other for convenience.

The main battery 3 is connected to the PCU 5 via a system main relay 4. The system main relay 4 is a switch that connects or interrupts the main battery 3 to or from a drive system of the vehicle. The system main relay 4 is switched by an upper-level controller 80. On the other hand, the auxiliary battery 6 is connected to a plurality of auxiliaries (hereinafter, referred to as "auxiliaries") that operate at a low voltage via a power supply harness 7. The auxiliaries include the PCU 5, the car navigation system 8, the room lamp 9, and the like. The power supply harness 7 is running in the hybrid vehicle 2 in correspondence with locations at which the auxiliaries are installed, and an end portion of the power supply harness 7 is connected to an output end 60b of a step-down converter 60. The output end 60b is a high-potential-side output end, and a low-potential-side output end is grounded to a vehicle body. It should be noted that one end of each of the auxiliary battery 6, the car navigation system 8 and the room lamp 9 are grounded in FIG. 1. That is, a low-potential side of a power supply end of each of the auxiliaries is equalized to a ground potential through the vehicle body.

The PCU 5 converts the direct-current power of the main battery 3 to alternating-current power suitable for driving the motor MG. The PCU 5 includes a voltage converter circuit 20, an inverter circuit 30, a discharge circuit 40, a controller 50, an interrupter switch 71 and the step-down converter 60. The voltage converter circuit 20 steps up the voltage of the main battery 3 to a voltage (for example, 500 volts) suitable for driving the motor MG. The inverter circuit 30 converts stepped-up direct-current power to alternating-current power. The PCU 5 accommodates these components in the same casing (indicated by the dashed line in FIG. 1). Thus, the discharge circuit 40 and the controller 50 are reliably activated after a collision. The output of the inverter circuit 30 corresponds to electric power supplied to the motor MG.

The hybrid vehicle 2 is able to generate electric power with the use of the motor MG by utilizing the driving force of the engine EG or the deceleration energy of the vehicle. When the motor MG generates electric power, the inverter circuit 30 converts alternating-current power to direct-current power, and the voltage converter circuit 20 additionally steps down the voltage of the direct-current power to a voltage slightly higher than that of the main battery 3 and supplies the direct-current power to the main battery 3.

The voltage converter circuit 20 is a circuit that is mainly formed of a reactor 21 and switching transistors 22, 24, such as IGBTs. Protection diodes are respectively connected in antiparallel with the switching transistors 22, 24. The switching transistors 22, 24 and their peripheral circuit may be, for example, packaged as an intelligent power module (IPM).

The inverter circuit 30 is a circuit that is mainly formed of switching transistors 31, 32, 33, 34, 35, 36 (hereinafter, these reference numerals are collectively indicated by "31 to 36") that undergo switching control in correspondence with the U, V, W phases of the Motor MG. Protection diodes are respectively connected in antiparallel with these switching transistors 31 to 36. The switching transistors 31 to 36 and their peripheral circuit may also be packaged as an intelligent power module (IPM) as in the case of the switching transistors 22, 24.

The voltage converter circuit 20 and the inverter circuit 30 both are connected to the controller 50, and control terminals of the switching transistors that constitute those circuits are controlled by the controller 50. That is, the voltage converter circuit 20 and the inverter circuit 30 execute switching control for converting direct-current power to alternating-current power on the basis of a supplied PWM signal generated by the controller 50.

A capacitor 14 is connected to a high-voltage side (that is, an inverter circuit side) of such the voltage converter circuit 20 in parallel with the voltage converter circuit 20. A capacitor 12 is connected to a low-voltage side (that is, a main battery side) of the voltage converter circuit 20 in parallel with the voltage converter circuit 20. The capacitor 14 is inserted in order to smooth current that is input to the inverter circuit 30. The capacitor 12 is inserted in order to smooth current that is input to the voltage converter circuit 20. The PCU 5 includes two voltage sensors 51, 52. The voltage sensor 51 measures the terminal voltage VL of the capacitor 12. The voltage sensor 52 measures the terminal voltage VH of the capacitor 14.

A power line at the high-potential side of the switching transistor 22 of the voltage converter circuit 20 and the high-potential sides of the switching transistors 31, 33, 35 of the inverter circuit 30 is referred to as P line. In contrast, a power line at the low-potential side (ground side) of the switching transistor 24 of the voltage converter circuit 20 and the low-potential sides of the switching transistors 32, 34, 36 is referred to as N line. The capacitor 12 and the capacitor 14 are inserted between the P line and the N line. Large current is supplied from the main battery 3 to the motor MG, so the capacitor 12 and the capacitor 14 both have a large capacitance.

The discharge circuit 40 is connected in parallel with the voltage converter circuit 20 and the inverter circuit 30. In other words, the discharge circuit 40 is connected between the P line and the N line. The discharge circuit 40 is formed of a high heat-resistant discharge resistor 42 and a switching transistor 44 connected in series with each other. A control terminal of the switching transistor 44 is connected to the controller 50, and the controller 50 controls the on/off state of the switching transistor 44. The discharge resistor 42, the switching transistor 44 and the controller 50 correspond to a discharger.

When the switching transistor 44 is turned on, the discharge resistor 42 is connected between the P line and the N line, and a closed circuit is formed by the capacitor 14, the discharge resistor 42 and the switching transistor 44. Therefore, electric charge stored in the capacitor 14 flows through the discharge resistor 42. Electric power that has flowed through the discharge resistor 42 becomes thermal energy and dissipates. That is, the discharge resistor 42 discharges the capacitor 14 by generating heat by itself The capacitor 12 is electrically connected to the P line via the reactor 21 and the protection diode for the switching transistor 22. Therefore, when the switching transistor 44 is turned on, a closed circuit is formed by the capacitor 12, the reactor 21, the protection diode of the switching transistor 22, the discharge resistor 42 and the switching transistor 44, and electric charge stored in the capacitor 12 flows through the discharge resistor 42. Thus, the discharge resistor 42 also discharges the capacitor 12.

Such discharging operation of the capacitors with the use of the discharge circuit 40 is directly controlled by the controller 50. The upper-level controller 80 that corresponds to the upper-level system of the controller 50 instructs the discharge circuit 40 to be driven. The upper-level controller 80 transmits a signal for driving the discharge circuit 40 to the lower-level controller 50 in response to a collision signal that is received from an airbag controller 90 of an airbag system including an acceleration sensor. Upon reception of the signal, the controller 50 executes control for turning on the switching transistor 44 of the discharge circuit 40, and discharges electric power by flowing electric charge stored in the capacitor 14, and the like, through the discharge resistor 42.

The controller 50 is an information processing device formed of electronic components, such as a microcomputer, a memory and an input/output interface. The voltage converter circuit 20, the inverter circuit 30, the discharge circuit 40 and the upper-level controller 80 are connected to the controller 50, and the voltage sensors 51, 52 and the step-down converter 60 are also connected to the controller 50 in the embodiment. Switching control over the above-described voltage converter circuit 20 and inverter circuit 30 is executed by the controller 50.

The controller 50 turns off the system main relay 4 and turns on the switching transistor 44 in response to a collision signal from the airbag controller 90. As a result, after the electrical connection between the main battery 3 and the PCU 5 has been disconnected, the discharge resistor 42 is connected to the capacitors 12, 14, so electric power stored in these capacitors 12, 14 is converted to thermal energy, that is, stored remaining electric charge is consumed.

The controller 50 should discharge the capacitors 12, 14 by driving the discharge circuit 40 after reception of a collision signal In the event of a collision of the vehicle, the power supply harness running in the vehicle may be disconnected or the power supply harness 7 or any one auxiliary may have a ground fault. The alternate long and two-short dashed line denoted by the reference sign CS in FIG. 1 indicates a ground fault of the power supply harness 7. The controller 50 is also one of the auxiliaries, and normally receives electric power that is fed through the power supply harness 7. It is not desirable that the controller 50 be inoperable at the time when the power supply harness 7 has a ground fault. Therefore, the hybrid vehicle 2 includes the following mechanism of switching a power supply path. The controller 50 normally receives electric power that is fed through the power supply harness 7 but the controller 50 operates on electric charge stored in the capacitor 12 or the capacitor 14 in the case where the power supply harness 7 has a ground fault or a break. The mechanism will be described below.

The step-down converter 60 is a voltage conversion device that inputs the voltage of the main battery 3, steps down the voltage to a driving voltage of the auxiliaries and outputs the stepped-down voltage. An input end 60a of the step-down converter 60 is connected to an output side of the system main relay 4, and the output end 60b of the step-down converter 60 is connected to the power supply harness 7 via the interrupter switch 71. Thus, the step-down converter 60 charges the auxiliary battery 6 via the power supply harness 7. In FIG. 1, the reference sign of a ground connected to the step-down converter 60 is not shown, but it should be noted that a reference potential (minus side) of the step-down converter 60 is connected to the ground (the body of the hybrid vehicle 2).

Figure 2:
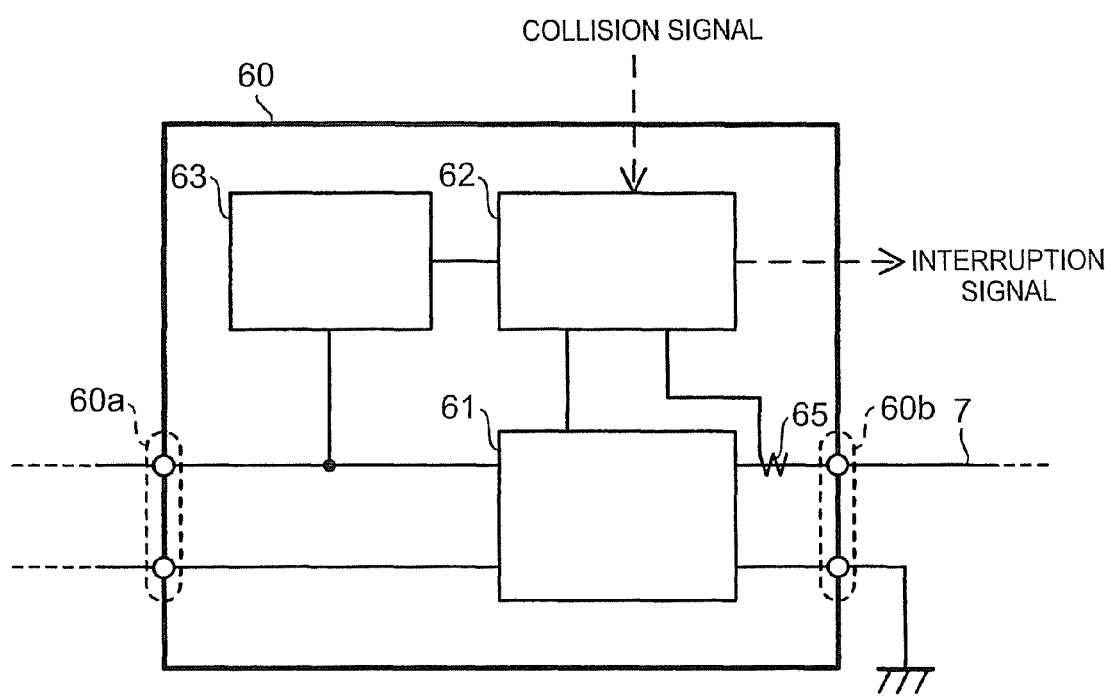
FIG. 2 is a block diagram that shows the configuration of a step-down converter.

The configuration of the step-down converter 60 is shown in FIG. 2. Description will be made with reference to FIG. 2 from here. FIG. 2 shows a block diagram that shows the configuration of the step-down converter 60. The step-down converter 60 is formed of a voltage conversion circuit 61, a control unit 62, a power supply unit 63, and the like. The input end 60a is connected to the voltage conversion circuit 61, and the voltage conversion circuit 61 steps down a voltage (high voltage from the main battery 3) input from the input end 60a and outputs the stepped-down voltage to the output end 60b. A voltage is, for example, stepped down through switching control (PWM control) with the use of switching transistors. This control is based on a control signal (PWM signal) that is output from the control unit 62.

The control unit 62 is a control circuit that mainly executes switching control over the voltage conversion circuit 61. Switching control is typically implemented by PWM control, and the control unit 62 turns on or off the switching transistors such that the voltage conversion circuit 61 outputs a target output voltage. The control unit 62 also monitors an output current that is measured by a current sensor 65. When the output current of the voltage conversion circuit 61 becomes close to a predetermined maximum output current value of each switching transistor, switching control is stopped to protect electronic components, such as the switching transistors (overcurrent protection circuit).

The voltage conversion circuit 61 and the control unit 62 carry out the above-described operation upon reception of driving power supplied from the power supply unit 63. The control unit 62 according to the embodiment also executes harness interruption process (described later) in addition to such switching control. Therefore, the control unit 62 outputs an interruption signal to the interrupter switch 71. This will be described again with reference to FIG. 1. As shown in FIG. 1, the interrupter switch 71 and the anode sides of serially connected diodes 73, 74 are connected to the output end 60b of the step-down converter 60. The diode 74 is connected to a power receiving end 50a of the controller 50. Hereinafter, electrical connection between the output end 60b and the interrupter switch 71 is termed "first power supply path K", and electrical connection between the output end 60b and the power receiving end 50a of the controller 50 via the diodes 73, 74 is termed "third power supply path L".

The interrupter switch 71 is a normally-on (normally-closed) switching device that normally keeps an on state (conductive state). For example, the interrupter switch 71 is a semiconductor switch, such as an IGBT, or a mechanical switch, such as an electromagnetic relay. An interruption signal that is output from the control unit 62 of the step-down converter 60 is input to a control terminal for controlling the on/off state of the interrupter switch 71. In the embodiment, the interrupter switch 71 switches from the on (conductive) state into the off (interrupted) state when the interruption signal is input to the interrupter switch 71, and returns to the on (conductive state) when the interruption signal is not input to the interrupter switch 71.

The diode 73 and the diode 74 are connected in series with each other in the same orientation, and are inserted in the third power supply path L such that the cathode sides are oriented toward the power receiving end 50a of the controller 50. The diodes 73, 74 are, for example, silicon diodes, and their forward drop voltage is, for example, set to 0.6 volts. Therefore, driving power that is supplied through the third power supply path L to the power receiving end 50a of the controller 50 is a voltage lower by 1.2 volts than the voltage of the output end 60b of the step-down converter 60. Three or more of these diodes 73, 74 may be connected in series with each other as long as a decrease in feeding voltage due to a voltage drop does not influence the operation of the controller 50.

The power receiving end 50a of the controller 50 receives driving power supplied through second power supply path M. That is, the power supply harness 7 connected to the interrupter switch 71 is also connected to the power receiving end 50a of the controller 50 via the diode 72. The diode inserted in the second power supply path M is only the diode 72, and is set to have a forward drop voltage as in the case of the diodes 73, 74. Therefore, the voltage that is supplied to the power receiving end 50a of the controller 50 via the second power supply path M is a voltage lower by 0.6 volts than the voltage of the power supply harness 7.

Thus, when the interrupter switch 71 is in the on state, there are two power supply paths through which electric power is allowed to be supplied to the power receiving end 50a of the controller 50, that is, the third power supply path L including the diodes 73, 74 and the second power supply path M including the diode 72. However, the voltage drop in the third power supply path L is larger than the voltage drop in the second power supply path M, so the voltage that is supplied through the second power supply path M is higher at the power receiving end 50a than the voltage that is supplied through the third power supply path L. Therefore, the controller 50 receives driving power supplied through the second power supply path M. In other words, the voltage that is applied to the power receiving end 50a via the second power supply path M is higher by a voltage drop corresponding to the voltage drop of the single diode than the voltage that is applied via the third power supply path L, so the power receiving end 50a receives driving power supplied through the second power supply path M. Because the diodes 73, 74 are inserted, electric power that is supplied through the second power supply path M does not flow back through the third power supply path L.

The power receiving end 50a of the controller 50 is supplied with driving power from one of the second and third power supply paths M, L, having a higher potential of electric power supplied. However, when the interrupter switch 71 enters the off state, the voltage of the power supply harness 7 decreases to about a ground potential as will be described later. Thus, driving power is not supplied to the controller 50 via the second power supply path M from the power supply harness 7. Driving power is exclusively supplied through the third power supply path L. In this case, because the diode 72 is inserted, electric power that is supplied through the third power supply path L does not flow back through the second power supply path M.

All of the above-described the first power supply path K and the third power supply path L are connected inside the PCU 5; whereas connection of the second power supply path M to the power supply harness 7 is carried out outside the PCU 5. Therefore, a connector CN is provided at an end portion of the second power supply path M, corresponding to the anode side of the diode 72. The connector CN is provided so as to be detachable from a receptor (not shown) provided at the power supply harness 7. In the embodiment, the PCU 5 positions the second power supply path M as a normal route for receiving driving power supplied through the power supply harness 7.

This is because the voltage is more stable in the second power supply path M that passes through the power supply harness 7 than in the third power supply path L connected to the first power supply path K on the step-down converter 60 side. Many auxiliaries, such as the car navigation system 8 and the room lamp 9, that consume a certain level of electric power are connected to the power supply harness 7, so the voltage is relatively stable. In contrast, at a location (the first power supply path K) close to the output end 60b of the step-down converter 60 with respect to the interrupter switch 71, a voltage higher than the output voltage of the auxiliary battery 6 is supplied while the step-down converter 60 is operating. On the other hand, when the step-down converter 60 is not operating, a voltage lower than the output voltage of the auxiliary battery 6 is supplied via the auxiliary battery 6 and the interrupter switch 71. In this way, the voltage fluctuates in response to the operating state of the step-down converter 60 in the first power supply path K. In the range surrounded by the alternate long and short dashed line in FIG. 1, a circuit formed in the power supply harness 7, the interrupter switch 71 interposed in the power supply harness 7, the third power supply path L (including the diode 73 and the diode 74) and the second power supply path M (including the diode 72) is referred to as power supply path switching circuit 70 hereinafter.

In this way, the hybrid vehicle 2 according to the embodiment has the third power supply path L in addition to the normal second power supply path M as a route through which driving power is supplied to the controller 50. Thus, the controller 50 is allowed to receive driving power supplied through the third power supply path L from a current upstream side with respect to the interrupter switch 71. Therefore, even when the power supply harness 7 or part of the auxiliaries contacts a metal portion, such as the body of the hybrid vehicle 2, to cause overcurrent to flow through the step-down converter 60 and, as a result, the power supply harness 7 is interrupted by the interrupter switch 71, the power supply path switching circuit 70 executes control such that the controller 50 is allowed to receive driving power supplied through the third power supply path L thereafter in synchronization with the harness interruption process described below.

Figure 3:
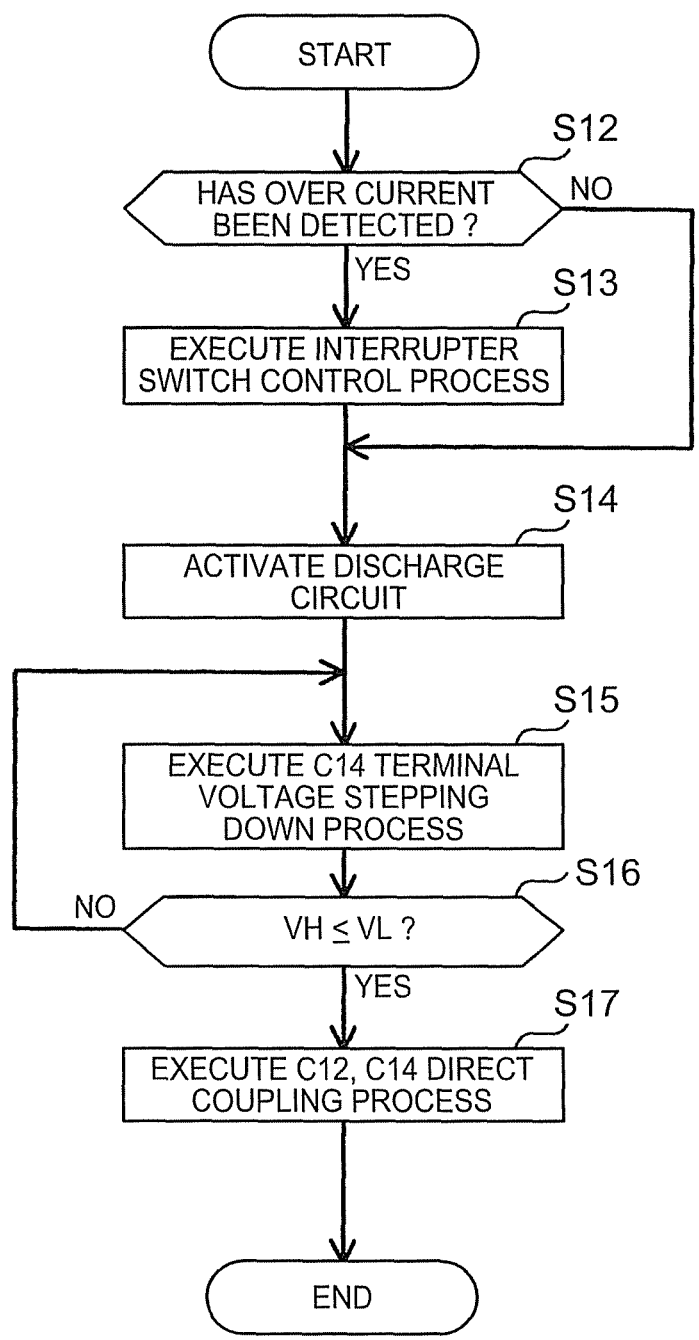
FIG. 3 is a flowchart that shows the flow of a harness interruption process that is executed by the step-down converter.

Here, the harness interruption process that is executed by the step-down converter 60 will be described. FIG. 3 shows a flowchart that shows the flow of the process that is executed by the step-down converter 60. The process of FIG. 3 is started up when a collision signal that is transmitted from the upper-level controller 80 has been received. As described above, the collision signal is transmitted from the upper-level controller 80 via the controller 50 as the signal for driving the discharge circuit 40. When the step-down converter 60 receives the collision signal, the step-down converter 60 executes the process of determining whether overcurrent has been detected in step S12 because there is a possibility that the hybrid vehicle 2 has collided with another vehicle, or the like. When a collision has been detected, the controller 50 also discharges the capacitors 12, 14, so the process of FIG. 3 includes a discharging process (step S14) that is executed by the controller 50.

The process of FIG. 3 is a process that is executed after a collision of the hybrid vehicle 2, and, initially, it is determined in step S12 whether overcurrent has occurred in the step-down converter 60. Overcurrent typically occurs because a ground fault has occurred as a result of contact of the power supply harness 7, any one auxiliary, or the like, with the metal portion, such as the body, due to, for example, impact caused by a collision. Detection of overcurrent is specifically determined in accordance with whether a current that exceeds a prescribed value has been detected on the basis of the output current value of the voltage conversion circuit 61, measured by the current sensor 65 (see FIG. 2). The prescribed value depends on the specific characteristic of the step-down converter 60, and is determined in advance through an experiment, simulation, or the like. When a current that exceeds the prescribed value has been detected (YES in S12), the process proceeds to an interrupter switch control process in the next step S13, and immediately controls the interrupter switch 71 to the off state. When a current that exceeds the prescribed value has not been detected (NO in S12), it may be determined that the power supply harness 7 is allowed to normally supply electric power. Therefore, the interrupter switch control process (S13) is skipped, and the process proceeds to the next process of S14. When the power supply harness 7, any one auxiliary, or the like, has a ground fault, the potential of the power supply harness 7 has decreased to the ground potential (or substantially the ground potential), so driving power is not supplied to the controller 50 or the auxiliaries, such as the car navigation system 8 and the room lamp 9.

When overcurrent has been detected in step S12 (YES in S12), the process of step S13 is executed. In step S13, the process of controlling the interrupter switch 71 is executed. In this process, the interrupter switch 71, which is of a normally-on type (normally-closed type), is controlled to the off state (non-conductive state), and the power supply harness 7 is electrically isolated from the output end 60b of the step-down converter 60 through this control. The output of the step-down converter 60 is isolated from the power supply harness 7 in a ground-fault state, so no overcurrent flows through the voltage conversion circuit 61, and output prohibition control that is executed by the overcurrent protection circuit is also cancelled.

Subsequently, the process of step S14 is executed by the controller 50. As described above, when the controller 50 receives a collision signal, the controller 50 interrupts the system main relay 4, and isolates the main battery 3 from the PCU 5. Thus, the PCU 5 cannot receive electric power supplied from the main battery 3. However, at this time, electric charge is stored in the capacitor 12 that is connected to the input end 60a of the step-down converter 60. Therefore, the step-down converter 60 receives electric power based on the remaining electric charge in the capacitor 12 at the input end 60a. Thus, the step-down converter 60 is able to output stepped-down electric power to the output end 60b. The controller 50 is able to receive driving power supplied from the step-down converter 60 through the third power supply path L, so the controller 50 is able to execute discharge control over the capacitors 12, 14 by activating the above-described discharge circuit 40.

The step-down converter 60 is isolated from the power supply harness 7 by activating the interrupter switch 71 in this way, and the remaining electric charge in the capacitor 12 is used as electric power that is input to the step-down converter 60. Thus, it is possible to continue supplying driving power to the controller 50. After step S13 or when negative determination is made in step S12 in the case where overcurrent has not been detected, the controller 50 executes the process of step S14. In step S14, the controller 50 turns on the switching transistor 44 of the discharge circuit 40. As a result, the discharge resistor 42 is connected to the capacitor 14, and the capacitor 14 is discharged.

If the remaining electric charge in the capacitor 12 becomes empty while the capacitor 14 is not sufficiently discharged, the controller 50 stops, and discharging of the capacitor 14 also stops. In the present embodiment, discharging of the capacitors 12, 14 is reliably completed by maintaining driving power supplied to the controller 50 with the use of the remaining electric charge in the capacitor 14. The process for the above is the process in step S15 to step S17.

In step S15, the process of stepping down the terminal voltage VH of the capacitor 14, which can be obtained from the remaining electric charge in the capacitor 14, with the use of the voltage converter circuit 20 and outputting the stepped-down terminal voltage VH is executed. Specifically, the output of the voltage converter circuit 20, that is, the terminal voltage VL of the capacitor 12, is stepped down so as to decrease to substantially the voltage of the main battery 3 through switching control (PWM control) over the switching transistors 22, 24, which is executed by the controller 50. The voltage VH of the capacitor 14 is measured by the voltage sensor 51, the voltage VL of the capacitor 12 is measured by the voltage sensor 52, and the voltage VH and the voltage VL are input to the controller 50. The controller 50 uses the data of those sensors, and continues step-down control in step S14 until the voltage VH of the capacitor 14 becomes lower than or equal to the voltage VL of the capacitor 12 (NO in S16).

When the voltage VH of the capacitor 14 becomes lower than or equal to the voltage VL of the capacitor 12 (YES in S16), the switching transistor 22 is switched into the on state and the switching transistor 24 is kept in the off state through step S17 in order to directly couple both the capacitors 12, 14. Thus, the capacitor 12 and the capacitor 14 are connected in parallel with each other in a direct-current manner.

Direct coupling of both capacitors through step S17 is, for example, continued until the voltage VL that is measured by the voltage sensor 52 becomes lower than or equal to a preset safe voltage. Alternatively, direct coupling is continued until the voltage based on electric power supplied from the capacitor 12 decreases and supply of driving power to the controller 50 by the step-down converter 60 becomes disabled. When supply of driving power to the controller 50 by the step-down converter 60 has become disabled, the discharging process executed by the controller 50 is forcibly ended. In such a case, the amount of remaining electric charge in both the capacitors 12, 14 is sufficiently low.

Step S12 and step S13 are also present as an independent routine for periodically monitoring overcurrent separately from the process in the flowchart shown in FIG. 3. Alternatively, the process of step S12 and step S13 may be constructed as not a routine that is periodically started up but an interrupt process that is started up in response to a signal from a sensor that detects overcurrent.

Figure 4:
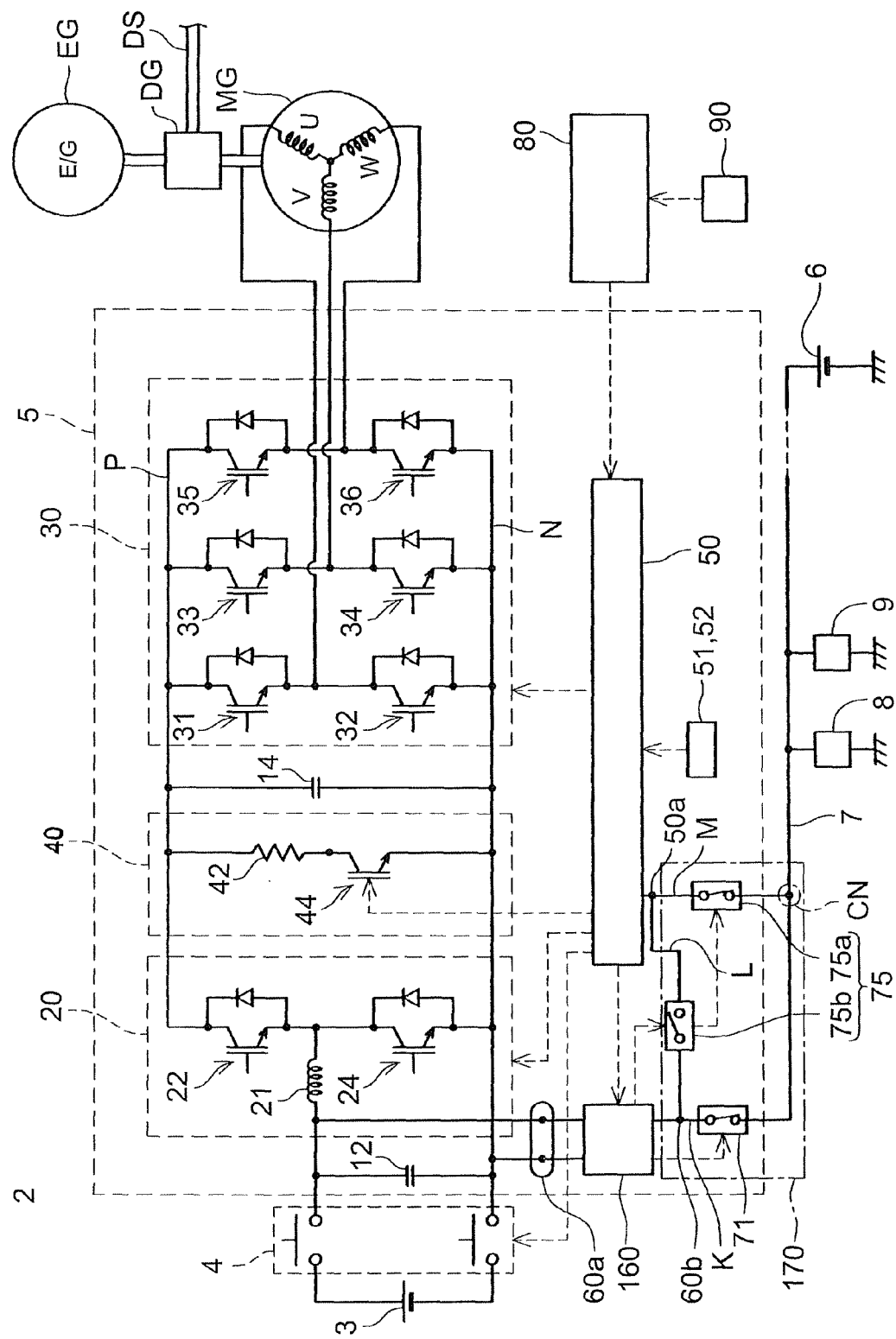
FIG. 4 is a block diagram that shows the configuration of a hybrid vehicle according to another embodiment.

Next, an alternative embodiment to the embodiment will be described with reference to FIG. 4. Like reference numerals in FIG. 4 denote substantially the same components to those of FIG. 1, and the description thereof is omitted. The present alternative embodiment differs from the above-described embodiment in that the above-described power supply path switching circuit 70 is replaced by a power supply path switching circuit 170 that uses a relay 75.

The relay 75 is formed of a first switch 75a and a second switch 75b for which on/off states are exclusively set. The relay 75 is, for example, a static relay (semiconductor relay) that is formed of a semiconductor switch, such as a solid state relay (SSR). The relay 75 may be a mechanical relay, such as an electromagnetic relay.

The first switch 75a of the relay 75 is interposed in the second power supply path M, and the second switch 75b is interposed in the third power supply path L. During normal times, the relay 75 is controlled by a step-down converter 160 such that the first switch 75a is set in an on state and the second switch 75b is set in an off state in order to supply driving power to the controller 50 through the power supply harness 7.

In a power supply harness interruption process according to the present alternative embodiment, control over the relay 75 is added in synchronization with step S13 of the flowchart shown in FIG. 3. In that step, in order to supply driving power from the step-down converter 160 to the controller 50, the relay 75 is controlled by the step-down converter 160 such that the first switch 75a is set in an off state and the second switch 75b is set in an on state.

By forming the power supply path switching circuit 170 and the step-down converter 160 in this way, the third power supply path L and the second power supply path M are switched exclusively and logically, so the second and the third power supply paths L, M are switched in a reliable manner. The first switch 75a and the second switch 75b are drawn as independent switches in the circuit diagram of FIG. 4; however, they may be formed of a single switching relay that has both a normally-open portion and a normally-closed portion. In this case, a normally-open-side contact is connected to the second power supply path M, a normally-closed-side contact is connected to the third power supply path L, and electric power for driving the switching relay should be supplied from the power supply harness 7. Through electric power fed through the power supply harness 7, the normally-closed side, that is, the third power supply path L, is opened, and the normally-open side, that is, the second power supply path M, enters a conductive state. If the power supply harness 7 has a ground fault or a break, electric power fed to the switching relay is lost, the normally-open side, that is, the second power supply path M, is opened, and the normally-closed side, that is, the third power supply path L, switches into a conductive state. That is, the power supply path to the controller 50 passively switches from the second power supply path M to the third power supply path L. In this base, the single switching relay is able to switch between the second and the third power supply paths L, M, so the number of components reduces as compared to the case where the diodes 72, 73, 74 are used like the above-described power supply path switching circuit 70.

In the above-described alternative embodiment, the relay 75 is used instead of the diodes 72, 73, 74 as a main component of the power supply path switching circuit. The power supply path switching circuit 70 that uses the diodes does not include electrical switching operation, so the power supply path is switched immediately after the power supply harness 7 is isolated. In contrast, the power supply path switching circuit 170 according to the alternative embodiment includes electrical switching operation, so, in comparison with the power supply path switching circuit 70 shown in FIG. 1, a period of time is required until the power feeding path switches after the power supply harness 7 is isolated. Thus, it should be noted that the power supply path switching circuit is formed of the circuit that utilizes the diodes shown in FIG. 1 more preferably than the circuit that utilizes the relay.

In the above-described embodiment and its alternative embodiment, the second power supply path M and the power supply harness 7 are connected with the connector CN. Therefore, even when electrical connection between the power supply harness 7 and the power receiving end 50a of the controller 50 through the second power supply path M becomes instable due to a contact failure, or the like, of the connector CN, a connection route through the third power supply path L via the interrupter switch 71 is reserved, so it is also possible to improve an instantaneous interruption resistance due to a contact failure of the connector CN.

Points to remember regarding the technique of the embodiment will be described. In the embodiment, when overcurrent of the step-down converter 60 has been detected, the power supply harness 7 is interrupted. A condition for interrupting the power supply harness 7 is not limited to overcurrent. For example, in terms of ensuring further safety, the power supply harness may be interrupted immediately when a collision has been detected. As described above, the process of the flowchart shown in FIG. 3 is started up when the step-down converter 60 receives a collision signal, and it is initially determined in step S12 whether overcurrent has been detected. When the process of step S12 is excluded, the step-down converter 60 interrupts the power supply harness 7 immediately when the step-down converter 60 receives a collision signal from the upper-level controller 80 (S13). That is, the process in which step S12 is deleted from the flowchart shown in FIG. 3 corresponds to the process of interrupting the power supply harness immediately when a collision has been detected. The step-down converter 60 may be configured to interrupt, the power supply harness 7 when not overcurrent but a ground fault has been detected by another sensor.

The hybrid vehicle 2 according to the embodiment switches the power supply path, through which electric power is supplied to the power receiving end 50a of the controller 50, from the second power supply path M through the power supply harness 7 to the third power supply path L from the side, including the step-down converter 60, with respect to the interrupter switch 71 when the interrupter switch 71 operates. It is desirable to switch the power supply path through which electric power is supplied to the power receiving end 50a of the controller 50. Instead, the controller 50 may constantly receive electric power supplied from the side, including the step-down converter 60, with respect to the interrupter switch 71 by removing the second power supply path M. With such a configuration as well, the controller 50 is allowed to continue operation even after the power supply harness 7 has been interrupted.

The motor MG corresponds to an example of a drive motor. The voltage converter circuit 20 and the inverter circuit 30 correspond to examples of an electric power converter. The car navigation system 8 and the room lamp 9 correspond to examples of an auxiliary. The discharge circuit 40 and the controller 50 correspond to an example of a discharger. The interrupter switch 71 corresponds to an example of an interrupter. The diode 72 corresponds to an example of a first diode. One of the diode 73 and the diode 74 corresponds to an example of a second diode, and the other one corresponds to an example of a voltage dropping device.

The discharge circuit is not limited to the discharge resistor of the embodiment. For example, the remaining electric charge in the capacitors 12, 14 may be consumed by rotating the motor with the use of the remaining electric charge in the capacitors 12, 14.

In the hybrid vehicle 2 according to the embodiment, the step-down converter 60 controls the interrupter switch 71 such that the power supply harness 7 is interrupted. Instead of such a configuration, it is also applicable that the controller 50 includes a small preliminary power supply and the controller 50 executes the process of the flowchart shown in FIG. 3 with the use of the preliminary power supply when overcurrent flows through the step-down converter 60 (or when another prescribed specific abnormality has been detected). A typical preliminary power supply is a capacitor.

In the embodiment, the hybrid vehicle 2 is applied; however, the technique described in the specification is suitably applied to a so-called pure electric vehicle that does not include an engine. Alternatively, the technique described in the specification may also be applied to a fuel-cell vehicle.

Specific examples of the invention are described in detail above; however, these are only illustrative, and do not limit the appended claims. The technique described in the claims encompasses various modifications and alterations of the above-illustrated specific examples. The technical elements described in the specification or the drawings exercise technical usability solely or in various combinations, and the combinations are not limited to the combinations recited in the claims for application. The technique illustrated in the specification or the drawings achieves multiple purposes at the same time, and has technical usability in achieving one of those purposes.

What is claimed is:

1. An electric vehicle comprising:
a main battery configured to store electric power that is supplied to a drive motor;
an electric power converter configured to convert direct-current power, which is supplied from the main battery, to driving power of the drive motor;
an auxiliary battery configured to supply direct-current power to auxiliaries having a lower driving voltage than a driving voltage of the drive motor;
a power supply harness connecting the auxiliary battery to the auxiliaries;
a step-down converter having an input end connected to the main battery and an output end connected to the power supply harness, the step-down converter being configured to step down an output voltage of the main battery to the driving voltage of the auxiliaries;
an interrupter configured to isolate the step-down converter from the power supply harness at the time when a predetermined specific abnormality has been detected;
a discharger configured to discharge a capacitor incorporated in the electric power converter, the discharger being configured to operate by receiving electric power supplied from a first power supply path which connects the output end of the step-down converter to the interrupter, the discharger includes a second power supply path through which electric power is supplied to a power receiving end of the discharger via the power supply harness and a third power supply path through which electric power is supplied to the power receiving end of the discharger from the first power supply path, and
a power feeding path switch configured to switch the second and the third power supply path, through which electric power is supplied to the power receiving end of the discharger, from the second power supply path to the third power supply path when the interrupter operates.

2. The electric vehicle according to claim 1, wherein the interrupter is configured to isolate the step-down converter from the power supply harness at the time when overcurrent has flowed through the power supply harness.

3. The electric vehicle according to claim 1, further comprising:
a casing configured to accommodate the electric power converter, the discharger, the step-down converter, the interrupter and the power feeding path switch in the same accommodating space.

4. The electric vehicle according to claim 3, wherein the power feeding path switch includes:
a first diode inserted in the second power supply path;
a second diode inserted in the third power supply path; and
a voltage step-down transformer configured to step down a voltage, which is supplied to the power receiving end of the discharger via the second diode, to a voltage lower than a voltage that is supplied to the power receiving end of the discharger via the first diode.

5. The electric vehicle according to claim 3, wherein the power feeding path switch includes a relay configured to switch a connection destination on the basis of whether electric power is supplied to the relay, the relay being configured to connect the power receiving end of the discharger to the second power supply path while electric power is being supplied to the relay and connect the power receiving end of the discharger to the third power supply path when supply of electric power to the relay is stopped.

6. The electric vehicle according to claim 1, wherein the discharger is configured to electrically interrupt the main battery from the electric power converter and connect a discharge resistor to the capacitor included in the electric power converter when a collision of the vehicle has been detected.

* * * * *